Feb. 11, 1947.   V. DAHLMAN   2,415,579
AIR FILTER CELL
Filed April 7, 1944

INVENTOR
VERNER DAHLMAN
BY Arthur H Robert
ATTORNEY

Patented Feb. 11, 1947

2,415,579

UNITED STATES PATENT OFFICE 2,415,579

AIR FILTER CELL

Verner Dahlman, Louisville, Ky., assignor to American Air Filter Company, Inc., Louisville, Ky., a corporation of Delaware Application April 7, 1944, Serial No. 529,977

5 Claims. (Cl. 183—71)

This invention relates to air filter cells of the type having an open faced frame and a corrugated filter medium.

The principal object of the invention is to provide a simple and inexpensive means for protecting each face of the filter medium and maintaining its corrugations in spaced relationship.

The invention is illustrated in the accompanying drawing wherein

Figure 1:
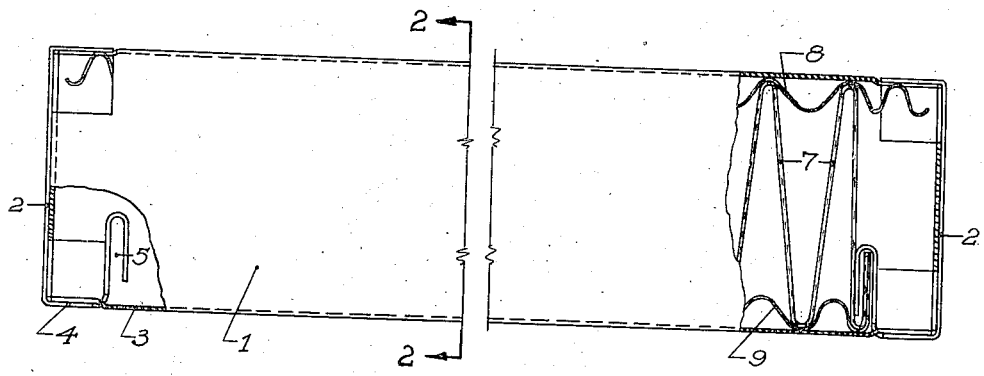
Fig. 1 is an elevational view looking at one side of an air filter cell embodying the invention, this side being partly broken to show the interior construction.
Figure 2:
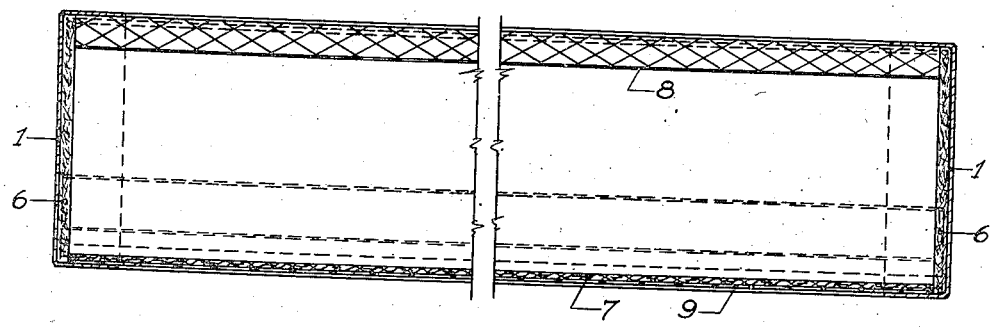
Fig. 2 is a section along line 2—2 of Figure 1.
Figure 3:
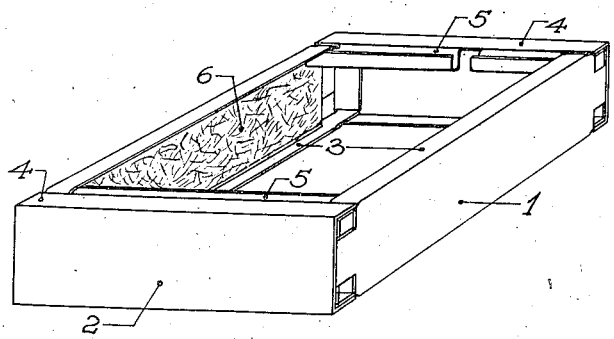
Fig. 3 is a perspective view of the open faced frame alone with the securing trough at one end broken for the sake of clearness.

The filter unit or cell illustrated includes an open faced frame having peripheral side walls 1 and end walls 2 with face flanges 3 and 4 on the side and end walls respectively, the face flanges being bent inwardly across the margins of each face of the unit. In other words, U-shaped channel members form the sides and ends of the frames with their bights functioning as peripheral walls and their sides as face flanges. The face flanges 4 of the end walls 2 are also reversely bent, along one face of the filter unit or cell, to extend inwardly into and thence outwardly from the interior of the cell and thereby provide a U-shaped sealing and securing trough 5 at each end of that particular face of the cell. That portion of the inner face of each side wall, which lies between the sealing trough 5, is preferably provided with a suitable sealing means such, for example, as the strips of felt 6 which are indicated in the drawing.

The filter medium 7 is in the form of a deformable sheet which extends in corrugated fashion from one trough 5 to the other, with its end edges sealed by their securement in the trough 5 and its side edges sealed by their contact with the side felts 6. By deformable, is meant a sheet which can be bent to corrugated form and when bent will retain such form. Any of the well known deformable media may be employed, the medium 7 shown consisting of a fourteen mesh wire screen covered on both sides by cotton or rayon fibers or flock which is adhesively secured to the screen in the manner indicated in U. S. Patent #1,886,927, or otherwise. A flexible deformable filter medium of this type, when corrugated, is yieldably rigid and self-sustaining to a degree sufficient to maintain its corrugated contour and resist collapse when subjected to gas pressures of the order created by its normal range of operative air flows but insufficient to resist collapse when subjected to gas pressures ranging substantially above normal.

In accordance with this invention the corrugations of the filter medium are held in proper space relation, along each face of the cell, by means of coarse wire screens 8 and 9. The corrugations in each face screen have the same pitch as those of the filter medium but are comparatively shallow in amplitude in relation to the amplitude of the filter medium corrugations. Each screen is positioned with its successive valleys or concavities along its inner side arranged to receive successive crests of the filter medium along one face of the cell but the crest-receiving valleys or concavities of the screen on the upstream or inlet face are preferably offset from the crest-receiving valleys or concavities of the screen on the downstream or outlet face so as to hold the crests of the filter medium along one face in offset relation to the crests along the other face. The end edges of one corrugated face screen 9 are preferably secured with the end edges of the filter medium 7 in the troughs 5. This is not essential, however, since the engagement between the side edges of each screen and the sealing felts normally is sufficient to hold the screens in place.

It will be appreciated that the corrugated screen faces provide a simple and inexpensive means for protecting the filter medium and for maintaining its corrugations in proper spaced relationship. By using screen corrugations which are shallow in relation to the corrugations of the filter medium, the amount of screen used in the cell, and the extent to which the screen obstruct the filter medium, are both minimized. While the filter medium employed may itself be very flexible, the corrugated screens, by engaging each crest of the filter medium along its entire length, prevent the displacement of each filter medium corrugation under unusual gas pressures which otherwise might collapse the medium. This is of particular advantage where the medium may be subject to explosive gas pressures such as are encountered as a result of backfire when filtering the air of airplane engines, for example.

Having described my invention, I claim:

1. An air filter cell comprising: an open faced frame having peripheral side and end walls with face flanges extending from said walls inwardly across the margins of each face of the cell, the end wall flanges along one face of the frame being extended reversely within the cell to provide U-shaped sealing and securing troughs at each end of that face of the cell; sealing felts extending along the inner face of each side wall between troughs; a flexible deformable filter medium extending in corrugated fashion from one sealing trough to the other with its straight end edges sealed in the troughs and its corrugated side edges sealed by the felt; and a relatively coarse wire screen extending in corrugated fashion along each face of the frame between its end walls, the corrugations of the screen being of relatively shallow amplitude in relation to the amplitude of the filter medium corrugations and the valleys of the inner face of the screen being positioned to receive the crests of the filter medium and engage them substantially throughout their length so as to hold the crests in spaced relationship and support the corrugations of the filter medium against displacement.

2. The cell of claim 1 wherein the end edges of one screen are secured in the troughs and the side edges of both screens engage the felts.

3. The cell of claim 1 wherein the corrugations of each screen have the same pitch as the corrugations of the filter medium and the crest-receiving valleys of one screen are offset from the crest-receiving valleys of the other screen.

4. An air filter cell comprising: an open faced frame having peripheral side and end walls; a flexible deformable filter medium extending in corrugated fashion between end walls so as to present straight end edges near the end walls and corrugated side edges along the side walls, each corrugation extending substantially from one face of the frame to the other, the corrugated medium being yieldably rigid and self-sustaining to a degree sufficient to maintain its corrugated contour and resist collapse when subjected to gas pressures of the order created by its normal range of operative air flows but insufficient to resist collapse when subjected to gas pressures ranging substantially above normal; means for sealing the straight end edges of the filter medium; felts positioned along each inner side wall to engage and seal the corrugated side edges of the filter medium; and a relatively coarse wire screen similarly extending in corrugated fashion along each face of the frame between its end walls, the corrugations of each screen being of relatively shallow amplitude in relation to the amplitude of the filter medium corrugations, the valleys of the inner face of each screen being positioned to receive the adjacent crest of the filter medium and engage them substantially throughout their length so as to hold the crest in spaced relationship and support the corrugations of the filter medium against displacement and collapse, the corrugated side edges of the screen engaging the sealing felts and being anchored in place by such engagement.

5. The cell of claim 4 wherein the crest-receiving valleys of the screen of one face are offset from the crest-receiving valleys of the screen along the other face.

VERNER DAHLMAN.

REFERENCES CITED

The following references are of record in the file of this patent:

UNITED STATES PATENTS

| Number | Name | Date |
|---|---|---|
| 1,056,108 | Lunken | Mar. 18, 1913 |
| 1,883,715 | Greene | Oct. 18, 1932 |
| 2,080,154 | Strindberg | May 11, 1937 |
| 2,198,189 | Vokes | Apr. 23, 1940 |
| 2,232,065 | Hasselwander | Feb. 18, 1941 |